(12) United States Patent
Tsai et al.

(10) Patent No.: US 12,420,583 B2
(45) Date of Patent: Sep. 23, 2025

(54) COMPOSITE RIM

(71) Applicant: Marshal Industrial Corp., Tortola (VG)

(72) Inventors: Ming-Jen Tsai, Miaoli County (TW); Chao-Chen Hung, Miaoli County (TW); Shih-Tse Yu, Miaoli County (TW)

(73) Assignee: MARSHAL INDUSTRIAL CORP., Tortola (VG)

( * ) Notice: Subject to any disclaimer, the term of this patent is extended or adjusted under 35 U.S.C. 154(b) by 403 days.

(21) Appl. No.: 18/164,777

(22) Filed: Feb. 6, 2023

(65) Prior Publication Data

US 2024/0262127 A1 Aug. 8, 2024

(51) Int. Cl.
B60B 5/02 (2006.01)
B60B 21/02 (2006.01)

(52) U.S. Cl.
CPC ............... B60B 5/02 (2013.01); B60B 21/02 (2013.01); *B60B 2310/318* (2013.01); *B60B 2360/341* (2013.01)

(58) Field of Classification Search
CPC .. B60B 5/00; B60B 5/02; B60B 21/02; B60B 21/12; B29C 53/56; B29C 70/24
See application file for complete search history.

(56) References Cited

U.S. PATENT DOCUMENTS

| | | | | | |
|---|---|---|---|---|---|
| 3,917,352 | A * | 11/1975 | Gageby | ............... | B29C 70/24 301/64.702 |
| 5,540,485 | A * | 7/1996 | Enders | ............... | B60B 1/003 301/64.704 |
| 6,761,847 | B2 * | 7/2004 | Meggiolan | ............ | B29C 70/446 264/258 |
| 7,377,595 | B1 * | 5/2008 | Okajima | ................. | B60B 1/041 301/58 |
| 9,149,992 | B2 * | 10/2015 | Yu | ............................ | B29C 70/34 |
| 11,142,020 | B2 * | 10/2021 | Christensen | ............ | B60B 1/043 |
| 11,628,682 | B2 * | 4/2023 | Morse | ..................... | B60B 1/043 301/95.102 |
| 2020/0114680 | A1 * | 4/2020 | Morse | ...................... | B60B 5/02 |

FOREIGN PATENT DOCUMENTS

JP 61244602 A * 10/1986

OTHER PUBLICATIONS

Tyler Benedict, "Velocite's new Venn Composite rims break the mold w/ filament wound, single strand carbon construction", Mar. 4, 2015, https://bikerumor.com/velocites-new-venn-composite-rims-break-the-mold-w-filament-wound-single-strand-carbon-construction/ , pp. 1-3. (Year: 2015).*

* cited by examiner

*Primary Examiner* — Kip T Kotter
(74) *Attorney, Agent, or Firm* — Muncy, Geissler, Olds & Lowe, P.C.

(57) ABSTRACT

A composite rim is provided, including: an annular body extending around a center, an imaginary annular line being defined on an outer surface of the annular body, the imaginary annular line extending around the center; and at least one composite fiber strip, spirally disposed around the imaginary annular line for at least 360 degrees and attached to the outer surface of the annular body, opposing ends of each of the at least one composite fiber strip in a longitudinal direction of the at least one composite fiber strip being aligned with the imaginary annular line.

10 Claims, 5 Drawing Sheets

COMPOSITE RIM

BACKGROUND OF THE INVENTION

Field of the Invention

The present invention relates to a composite rim.

Description of the Prior Art

A conventional method of manufacturing a carbon fiber rim includes following steps: pre-immersing carbon fiber sheets in resin, pasting the carbon fiber sheets with the resin on an annular core (such as a bladder) into several layers; and placing the processed annular core in a mold and molding by thermoforming.

However, the conventional method has many disadvantages. For example, the pre-immersed carbon fiber sheets need to be pasted by manpower, which is time-consuming and labor-intensive; directions of carbon fibers of the carbon fiber sheets are inconsistent and discontinuous, and transmission of stress may be discontinuous when the carbon fiber sheets are overlapped with each other so that structural integrity and structural strength of the wheel rim are poor; each of the overlaps of the carbon fiber sheets has large, many and uneven gaps which can result in more large bubbles after the thermoforming and low yield.

The present invention is, therefore, arisen to obviate or at least mitigate the above-mentioned disadvantages.

SUMMARY OF THE INVENTION

The main object of the present invention is to provide a composite rim which has good structural strength and better flatness.

To achieve the above and other objects, a composite rim is provided, including: an annular body extending around a center, an imaginary annular line being defined on an outer surface of the annular body, the imaginary annular line extending around the center; and at least one composite fiber strip, spirally disposed around the imaginary annular line for at least 360 degrees and attached to the outer surface of the annular body, opposing ends of each of the at least one composite fiber strip in a longitudinal direction of the at least one composite fiber strip being aligned with the imaginary annular line.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 4 for a preferable embodiment of the present invention. A composite rim 1 of the present invention includes an annular body 10 and at least one composite fiber strip 20.

The annular body 10 extends around a center C, an imaginary annular line R is defined on an outer surface of the annular body 10, and the imaginary annular line R extends around the center C. The at least one composite fiber strip 20 is spirally disposed around the imaginary annular line R for at least 360 degrees and attached to the outer surface of the annular body 10, and opposing ends 21 of each of the at least one composite fiber strip 20 in a longitudinal direction of the at least one composite fiber strip 20 are aligned with the imaginary annular line R. The at least one composite fiber strip 20 can be, for example, made of carbon fiber or other fiber strips pre-impregnated with resin. As such, it is equivalent to that only a single break point formed by each of the at least one composite fiber strip 20 which spirals for at least one circle, which provides excellent structural strength and better flatness.

Figure 1:
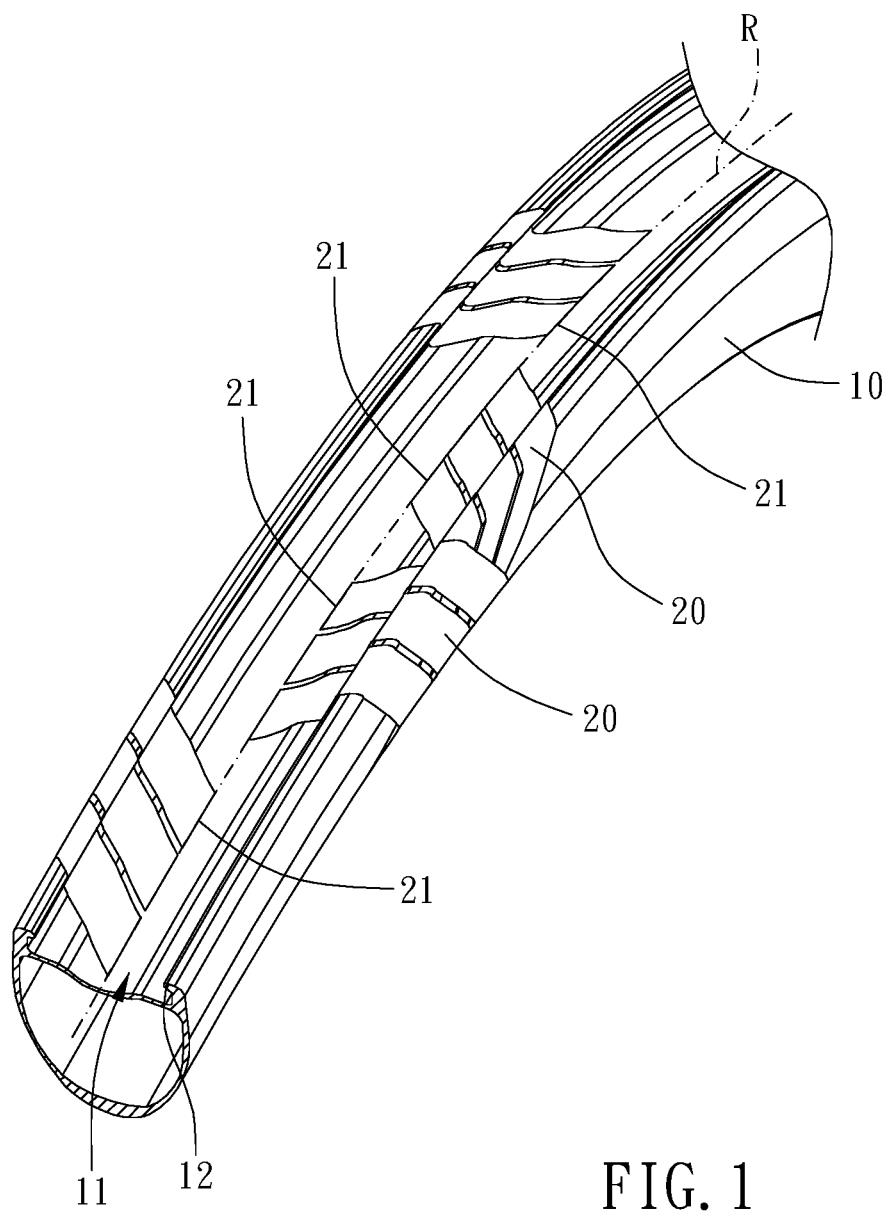
FIG. 1 is a partial stereogram of a preferable embodiment of the present invention.
Figure 2:
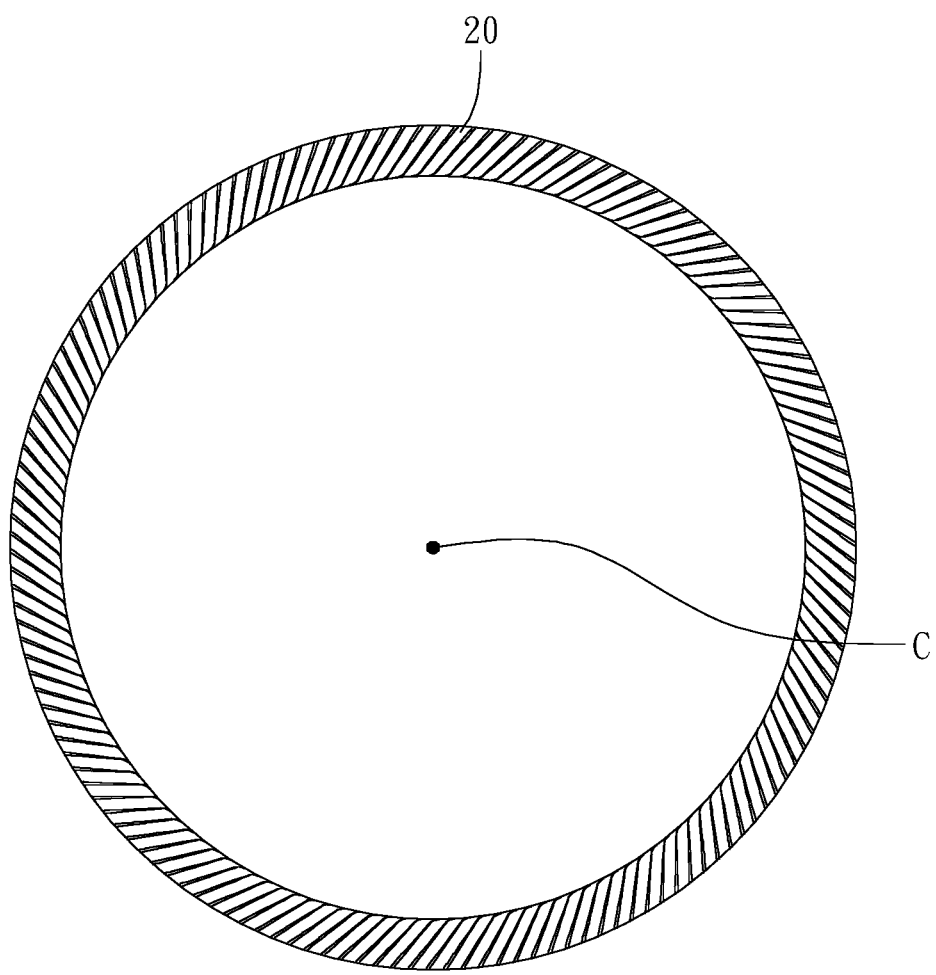
FIGS. 2 and 3 are drawings showing at least one composite fiber strip spirally disposed around an annular body according to a preferable embodiment of the present invention.
Figure 3:
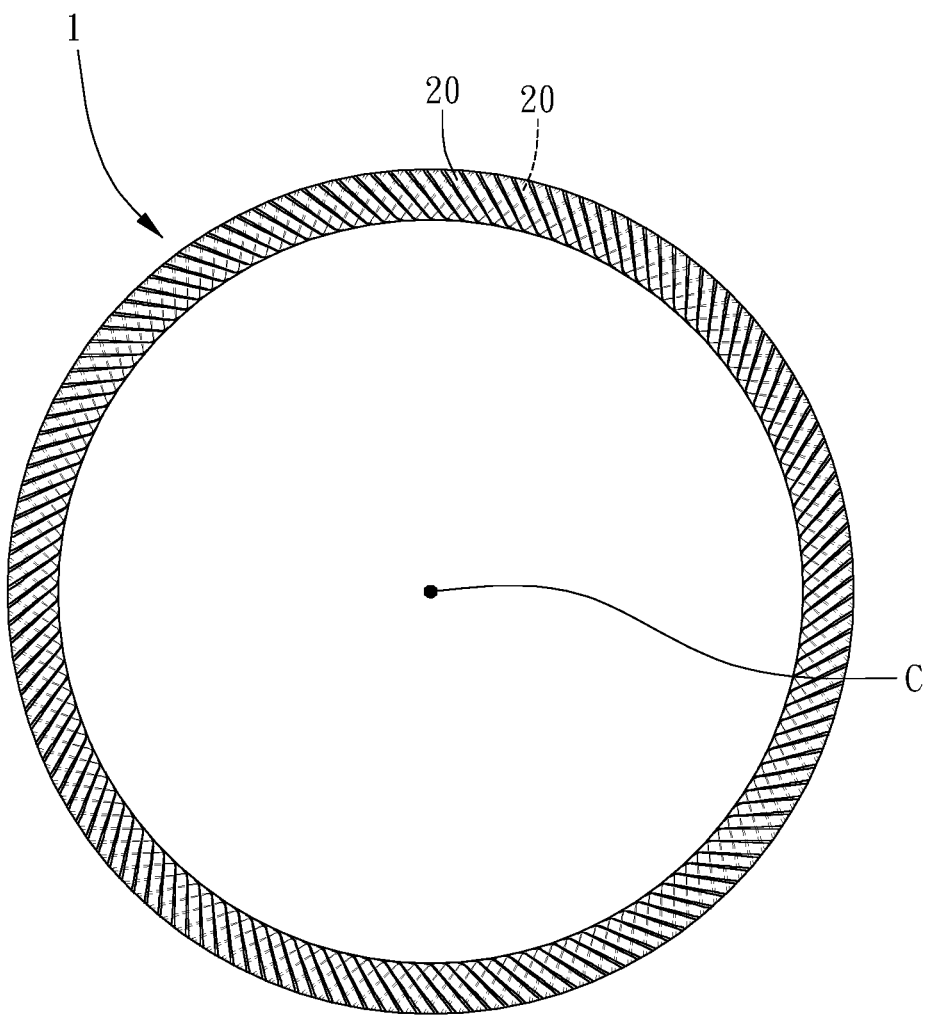
Figure 4:
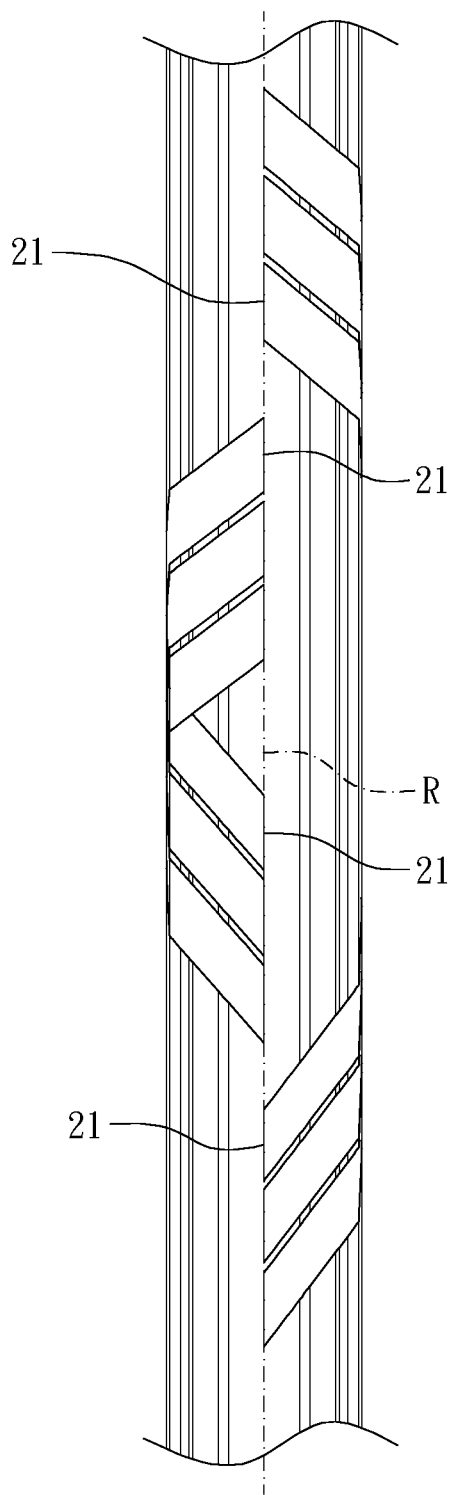
FIG. 4 is a top view FIG. 1.
Figure 5:
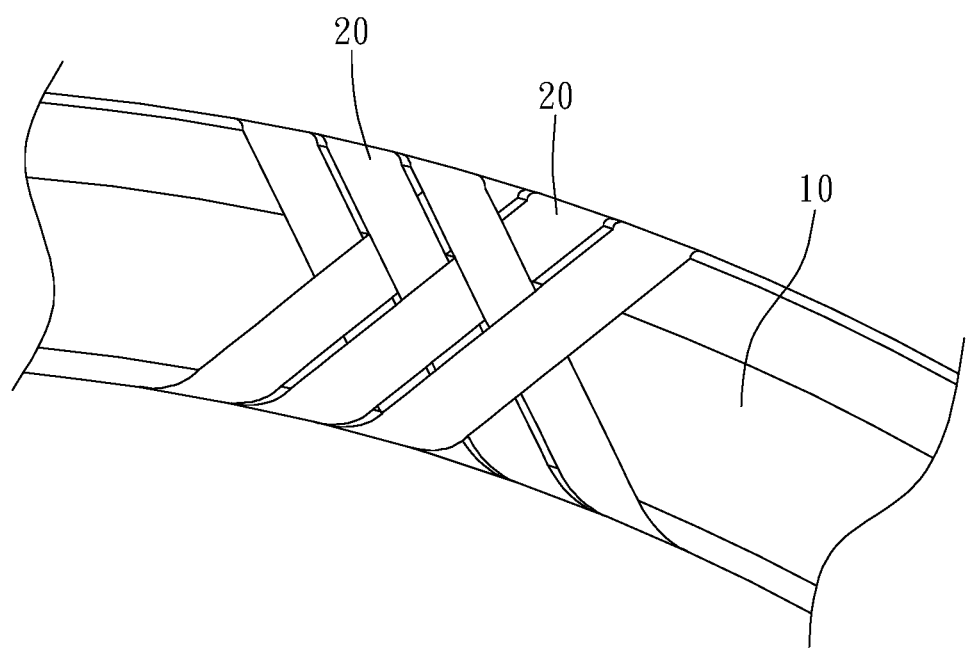
FIG. 5 is a schematic drawing of a preferable embodiment of the present invention.

In this embodiment, the at least one composite fiber strip includes a plurality of composite fiber strips 20, and at least two of the plurality of composite fiber strips 20 spiral in different angles. Preferably, the at least two of the plurality of composite fiber strips 20 spiral in opposing directions (clockwise and counterclockwise, for example), the at least two of the plurality of composite fiber strips 20 are at least partially overlapped with each other; however, the plurality of composite fiber strips 20 may be interlaced with each other (FIG. 5), which can comprehensively, omnidirectionally and evenly enhance and strengthen the structural strength, and evenly distribute the stress.

Specifically, the opposing ends 21 of each of the at least one composite fiber strip 20 are not overlapped with each other on the imaginary annular line R; one of the opposing ends 21 of one of the plurality of composite fiber strips 20 is located between the opposing ends 21 of another one of the plurality of composite fiber strips 20; however, the opposing ends 21 of each of the at least one composite fiber strip 20 may be at least partially or entirely overlapped with each other on the imaginary annular line R. The aforementioned arrangements of the at least one composite fiber strip 20 contributes to the flatness of the surface of the composite rim 1. Preferably, the at least two of the plurality of composite fiber strips 20 are perpendicular to each other, which increases the structural strength and effectively and evenly distribute the stress. Preferably, relative to the center C the at least one composite fiber strip 20 is arranged along the imaginary annular line R for at least 350 degrees. As such, the entire range of the outer surface of the annular body 10 is almost or completely wrapped continuously and uninterruptedly, so that the structure has good integrity and structural strength, the manufacturing process is simple and the yield is high.

In this embodiment, the annular body 10 includes a tire installation groove 11, the annular body 10 further includes two annular lips 12, the two annular lips 12 project toward each other from two peripheries of the tire installation groove 11, the imaginary annular line R extends within the tire installation groove 11, and the at least one composite fiber strip 20 is conformably adhered to a surface of the tire installation groove 11. As such, the thinner side wall of the tire installation groove 11 can be highly strengthened and is not easy to be damaged and deformed. It is noted that the tire installation groove may be provided without the two annular lips and can be adapted to a tubular tire; the imaginary annular line may extend annularly on other sides of the annular body 10 but not within the tire installation groove 11.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A composite rim, including:
   an annular body extending around a center, an imaginary annular line being defined on an outer surface of the annular body, the imaginary annular line extending around the center; and
   at least one composite fiber strip, spirally disposed around the imaginary annular line for at least 360 degrees and attached to the outer surface of the annular body, opposing ends of each of the at least one composite fiber strip in a longitudinal direction of the at least one composite fiber strip being aligned with the imaginary annular line.

2. The composite rim of claim 1, wherein the at least one composite fiber strip includes a plurality of composite fiber strips, and at least two of the plurality of composite fiber strips spiral in different angles.

3. The composite rim of claim 2, wherein the at least two of the plurality of composite fiber strips spiral in opposing directions.

4. The composite rim of claim 3, wherein the at least two of the plurality of composite fiber strips are at least partially overlapped with each other.

5. The composite rim of claim 4, wherein the at least two of the plurality of composite fiber strips are perpendicular to each other; one of the opposing ends of one of the plurality of composite fiber strips is located between the opposing ends of another one of the plurality of composite fiber strips; the opposing ends of each of the at least one composite fiber strip are not overlapped with each other on the imaginary annular line.

6. The composite rim of claim 1, wherein the at least one composite fiber strip includes a plurality of composite fiber strips, and one of the opposing ends of one of the plurality of composite fiber strips is located between the opposing ends of another one of the plurality of composite fiber strips.

7. The composite rim of claim 1, wherein the opposing ends of each of the at least one composite fiber strip are not overlapped with each other on the imaginary annular line.

8. The composite rim of claim 1, wherein the annular body includes a tire installation groove, and the imaginary annular line extends within the tire installation groove.

9. The composite rim of claim 8, wherein the at least one composite fiber strip is conformably adhered to a surface of the tire installation groove.

10. The composite rim of claim 8, wherein the annular body further includes two annular lips, and the two annular lips project toward each other from two peripheries of the tire installation groove.

\* \* \* \* \*